United States Patent [19]

Omoto

[11] Patent Number: 4,932,449
[45] Date of Patent: Jun. 12, 1990

[54] DUST COLLECTOR GUIDE FOR JOINT PLANER

[75] Inventor: Shoji Omoto, Hiroshima, Japan

[73] Assignee: Ryobi Ltd., Hiroshima, Japan

[21] Appl. No.: 406,391

[22] Filed: Sep. 12, 1989

[30] Foreign Application Priority Data

Sep. 21, 1988 [JP] Japan ................................ 63-124304

[51] Int. Cl.$^5$ .............................................. B27G 19/00
[52] U.S. Cl. .................................. 144/252 R; 51/268; 51/273; 83/100; 144/117 R; 144/129
[58] Field of Search .................. 144/129, 130, 252 R, 144/252 A, 117 R, 114 R; 83/100; 51/268, 273

[56] References Cited

U.S. PATENT DOCUMENTS

| 3,082,802 | 3/1963 | Dickson et al. | 144/252 R |
| 3,367,377 | 2/1968 | Mitten | 144/252 R |
| 3,664,394 | 5/1972 | Wells | 144/252 R |

*Primary Examiner*—W. Donald Bray
*Attorney, Agent, or Firm*—Sughrue, Mion, Zinn, Macpeak & Seas

[57] ABSTRACT

A joint planer has a chute for guiding chips resulting from a planing operation to a dust collector guide. The chute is attached to a vertically-movable table near its work surface and extends to the upper edge of the dust collector guide, which is below the planer cutting barrel. The lower end of the chute slides up and down against the edge of the dust collector guide with movement of the vertical table, thereby maintaining a closed path from the surface to the dust collector guide.

3 Claims, 2 Drawing Sheets

DUST COLLECTOR GUIDE FOR JOINT PLANER

BACKGROUND OF THE INVENTION

This invention relates to a dust collector guide for a joint planer.

Generally, a joint planer comprises a fixed table and a vertically-movable table which are disposed respectively on front and rear sides of a cutter head. A workpiece is cut, making use of a difference in level or height between the two tables, and a desired depth of cut can be obtained by suitably adjusting the height difference between the two tables. Chips produced during the cutting operation are guided to a dust collector guide disposed below the cutter head, and are discharged to the exterior through a discharge port, provided at the side of the planer, for example, by a flow of cooling air produced by a motor.

However, the conventional joint planer is not provided with any means for guiding the chips to the dust collector guide, nor is it provided with a means for preventing the scattering of the chips. Therefore, when a large amount of chips are produced, such as in the case of a deep cut or a long workpiece, the dust collection efficiency is lowered. Since this dust collection efficiency directly affects the efficiency of the cutting operation, the efficiency of the cutting operation is lowered.

In other words, when a large volume of chips is produced, problems are caused by the chips jamming in the planer, and therefore the feed of the workpiece or the depth of the cut must be reduced. This adversely affects the operability and efficiency of the planer.

SUMMARY OF THE INVENTION

The present invention has been made in view of the above problems, and an object of the invention is to provide a dust collector guide for a joint planer in which a chute for guiding chips to the dust collection guide is provided on an opened portion of a vertically-movable table disposed close to a cutter head, thereby enhancing the dust collection efficiency during the cutting operation so as to improve the efficiency of the cutting operation.

The above object is achieved by a dust collector guide for a joint planer comprising a fixed table and a vertically-movable table which are disposed respectively on front and rear sides of a cutter head; and a dust collector guide disposed below the cutter head so as to guide chips toward a discharge port; a chute mounted on an opened portion of the vertically-movable table disposed close to the cutter head; the chute being always held in sliding contact with an edge of an opening of the dust collector guide to close the opened portion.

The cutter head is driven for rotation by a motor, and a workpiece is fed from the vertically-movable table to the fixed table for cutting purposes, so that the workpiece is planed by a cutter of the cutter head because of a difference in level or height between the two tables. Chips produced at this time are guided to the dust collector guide, disposed below the cutter head, by the chute which is mounted on the open portion of the vertically-movable table. The guide is disposed close to the cutter head and closes the otherwise open portion of the vertically-movable table. The chips within the dust collector guide are discharged to the exterior through the discharge port, provided at the side of the planer, by the flow of cooling air produced by a fan of a motor.

In accordance with the upward and downward movements of the vertically-movable table, the depth of cut is reduced and increased, respectively. At this time, the chute moves upward and downward in unison with the vertically-movable table, and the chute is moved upward and downward in sliding contact with the edge of the opening of the dust collector guide. Therefore, the normally open portion of the vertically-movable table disposed close to the cutter head will not be open. Therefore, all the chips are guided into the dust collector guide, and will not be scattered exteriorly of the planer through an open portion.

DETAILED DESCRIPTION OF THE PREFERRED EMBODIMENT

Figure 1:
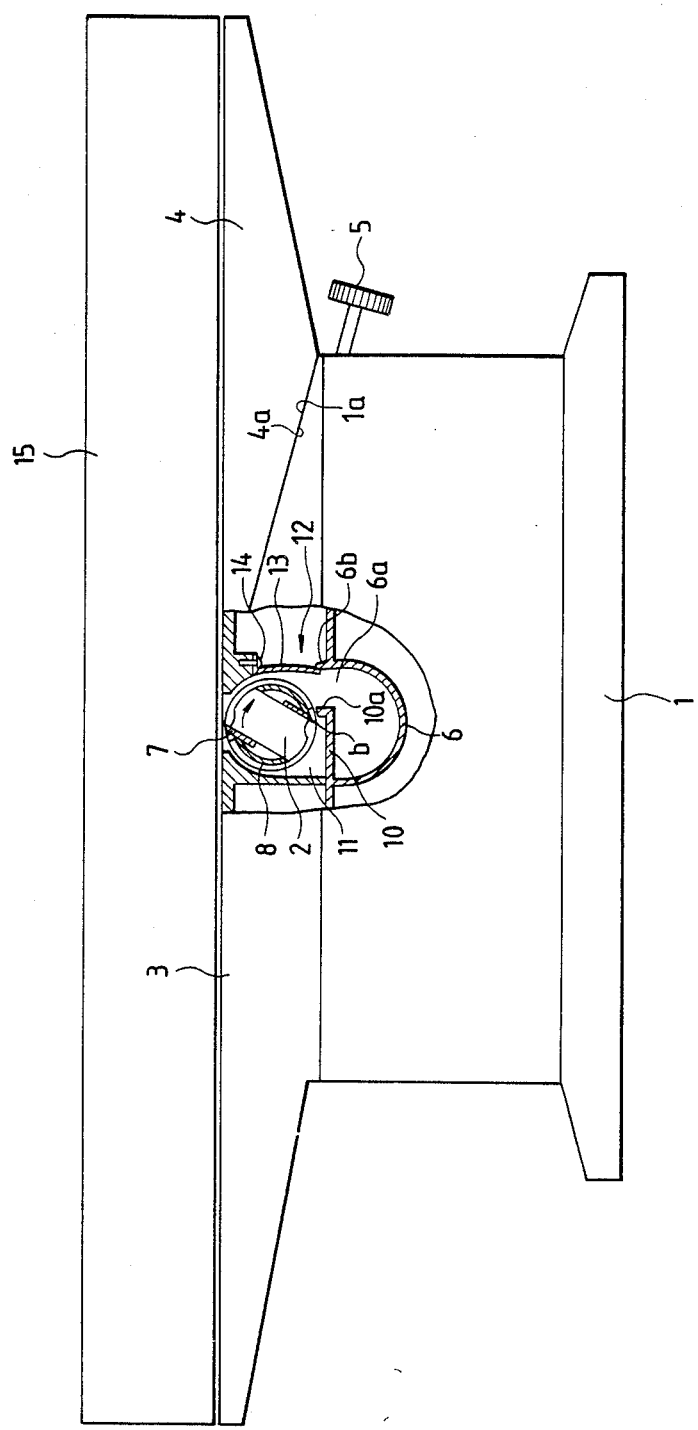
FIGS. 1 and 2 are partly cross-sectional, side-elevational views of a dust collector guide for a joint planer provided in accordance with the present invention, showing a non-cutting condition and a cutting condition, respectively.
Figure 2:
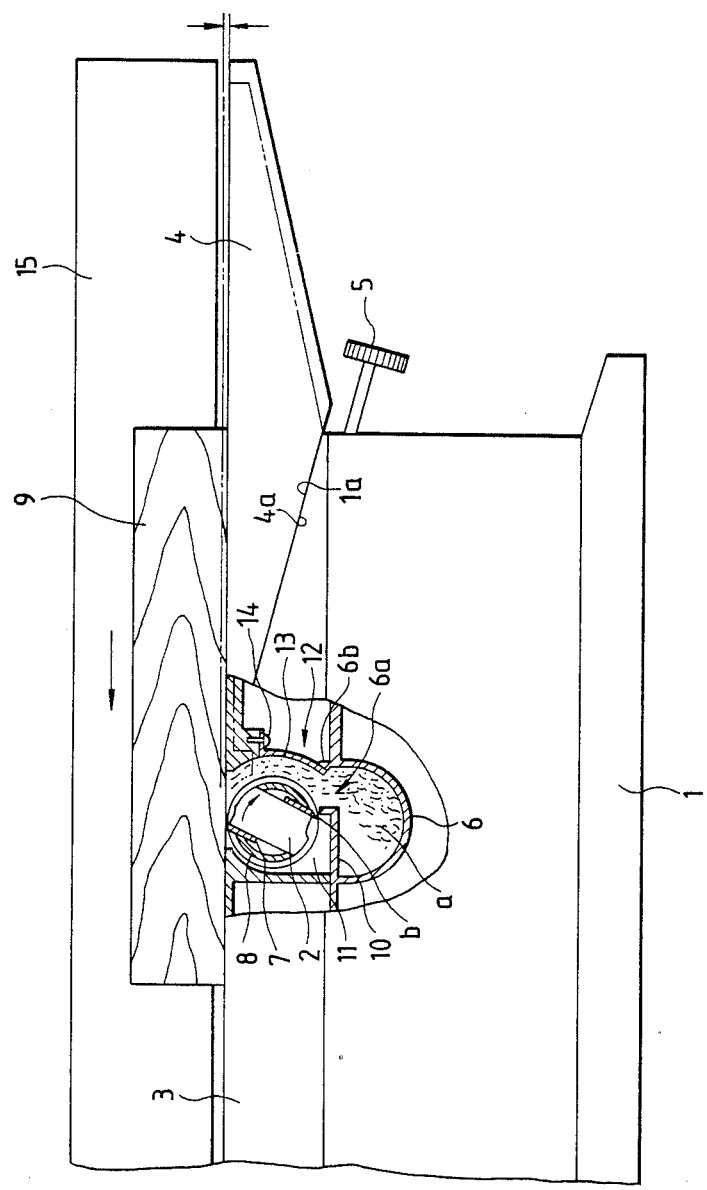

As shown in FIGS. 1 and 2, a cutter head 2 is rotatably mounted on a central portion of the upper side of a base 1, and is rotatably driven by a motor (not shown) via a speed reduction mechanism (not shown).

At the upper side of the base 1, a fixed table 3 and a vertically-movable table 4 are disposed respectively on the front and rear sides of the cutter head 2, the fixed table 3 being fixedly mounted on the base 1. Vertical movement-guiding surfaces 1a and 4a of the base 1 and the vertically-movable table 4, respectively, are slanting rearwardly and are mated with each other. The vertically-movable table 4 can be moved upward and downward relative to the base 1 by rotating a vertical movement-effecting handle 5. The arrangement described thus far is similar to that of a conventional joint planer.

A dust collector guide 6 is provided below the cutter head 2 and is in the form of a recess. The dust collector guide 6 extends along the length of the cutter head 2, and communicates at its one end with a discharge port (not shown) provided at the side of the planer. Chips a within the dust collector guide 6 are discharged to the exterior in the lateral direction of the planer through the discharge port by the flow of cooling air produced by the fan of a motor (not shown).

Cutters 7 are removably secured to the cutter head 2 by a cutter holder 8. The cutter head 2 is rotated in a clockwise direction as indicated by an arrow in the drawings, and in order that the chips a, produced from a workpiece 9 during the cutting operation, can be easily directed to the dust collector guide 6. The dust collector guide 6 has an opening 6a provided at an upper portion thereof disposed close to the vertically-movable table 4. The dust collector guide 6 also has a top wall 10 provided at an upper portion thereof disposed close to the fixed table 3, so that the dust collector guide 6 is separated at this upper portion from a cutter head-containing portion 11. The top wall 10 serves to prevent the chips a, received within the dust collector guide 6, from emitting upwardly therefrom. The top wall 10 has at its distal end an upstanding projection 10a which results in a very small gap b between a circular path of rotation of the tip end of the cutter 7 and the top wall 10.

The vertically-movable table 4 has an opened portion 12 at its lower side disposed close to the cutter head 2. A chute 13 is mounted on the end of the vertically-movable table 4, disposed close to the cutter head 2, so as to prevent the chips a from passing through the opened portion 12 and also to guide the chips a to the dust collector guide 6.

More specifically, the chute 13 is fixedly secured at its upper end to the vertically-movable table 4 by screws 14, so that the chute 13 is movable upward and downward together with the vertically-movable table 4. The lower end of the chute 3 is always held in sliding contact with an edge 6b of the opening 6a of the dust collector guide 6. With this arrangement, the opened portion 12 of the vertically-movable table 4 is always kept closed. In other words, even when the vertically-movable table 4 is moved upward and downward, the dust collector guide 6 does not communicate with the open portion 12.

When the vertically-movable table 4 moves upward and downward, the position of the chute 3 is changed as seen from FIGS. 1 and 2. Therefore, it is preferred that the chute 13 be made of a resilient plate, such as a stainless steel plate and a spring steel plate, so that the chute 13 is held in contact with the edge 6b of the opening 6a without any gap and can slide relative thereto regardless of the position of the chute 3, and also so that the gum or resin of the chips a is less liable to adhere to the chute 13.

In the drawings, reference numeral 15 denotes a fence, and 9 denotes a workpiece.

With the above construction of the present invention, the chips produced during the cutting operation are guided into the dust collector guide 6 by the chute 13, and the chute 13 is always held in sliding contact with the edge 6b of the opening 6a of the dust collector guide 6 even when the vertically-movable table 4 moves upward and downward, thus preventing the dust collector guide 6 from communicating with the open portion 12. Therefore, the scattering of chips toward the vertically-movable table 4 and other portions is prevented, thereby enhancing the dust collection efficiency and the operability.

As a result of the invention, it is not necessary to reduce the depth of cut or the length of feed of the workpiece to prevent jamming. Therefore, the efficiency of the cutting operation can be enhanced. Also, since the invention can be constructed easily by mounting the chute 13 on a portion of the vertically-movable table 4 disposed close to the cutter head 2, the construction is inexpensive and is suitable for mass production, and can achieve other advantages.

What is claimed is:

1. A joint planer comprising:
    a fixed table;
    a vertically-movable table disposed adjacent said fixed table and having a surface which moves vertically relative to a surface of said fixed table;
    a cutter head rotatably positioned to provide planing of a workpiece at the separation of said surfaces of said fixed and vertically-movable tables; and
    a dust collector guide disposed below said cutter head for guiding chips produced by planing a workpiece toward a discharge port, said dust collector guide including a chute mounted on said vertically-movable table disposed close to said cutter head and extending to and forming a sliding contact with an upper edge of one side of said dust collector guide so as to close a opened portion from the lower end portion of said vertically-movable table adjacent said cutter head to the upper edge of said dust collector guide.

2. A joint planer as claimed in claim 1, wherein said chute is a resilient metal plate attached at its upper end to said vertically-movable table at an end thereof adjacent said cutter head, and extending to a lower end which is below the upper edge of said dust collector guide; a portion near said lower end sliding on said upper edge of said dust collector guide as said vertically-movable table is moved up and down to close said opened portion from the lower portion of said vertically-movable table to said upper edge of said dust collector guide.

3. A joint planer as claimed in claim 1, wherein said chute is a resilient metal plate attached at its upper end to said vertically-movable table at an end thereof adjacent said cutter head, and extending to a lower end which is below the upper edge of said dust collector guide; the chute being movable upward and downward together with said vertically-movable table whereby said lower end of the chute is always held in sliding contact with the edge of the opening of the dust collector guide.

* * * * *